United States Patent
Ichikawa

(10) Patent No.: US 11,350,505 B2
(45) Date of Patent: May 31, 2022

(54) LIGHTING CIRCUIT

(71) Applicant: KOITO MANUFACTURING CO., LTD., Tokyo (JP)

(72) Inventor: Tomoyuki Ichikawa, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 17/173,665

(22) Filed: Feb. 11, 2021

(65) Prior Publication Data

US 2021/0168918 A1  Jun. 3, 2021

Related U.S. Application Data

(63) Continuation of application No. PCT/JP2019/033005, filed on Aug. 23, 2019.

(30) Foreign Application Priority Data

Aug. 27, 2018 (JP) .............................. JP2018-158493
Nov. 14, 2018 (JP) .............................. JP2018-214014

(51) Int. Cl.
*H05B 45/30* (2020.01)
*H05B 45/48* (2020.01)
(Continued)

(52) U.S. Cl.
CPC ........... *H05B 45/54* (2020.01); *B60Q 1/0094* (2013.01); *B60Q 1/2696* (2013.01); *H05B 45/48* (2020.01)

(58) Field of Classification Search
CPC ........ H05B 45/10; H05B 45/30; H05B 45/31; H05B 45/325; H05B 45/48; B60Q 1/0094; B60Q 1/2696; B60Q 11/00; B60Q 11/005

See application file for complete search history.

(56) References Cited

U.S. PATENT DOCUMENTS 9,763,296 B1 *  9/2017 Milanesi ................ H05B 45/44
2008/0191642 A1 *  8/2008 Slot ........................ H05B 47/16
                                                                            315/295

(Continued)

FOREIGN PATENT DOCUMENTS

JP        2011-192684 A       9/2011
JP        2011192684 A   *    9/2011
(Continued)

OTHER PUBLICATIONS

International Preliminary Report on Patentability (Form PCT/IB/373) and the Written Opinion of the International Searching Authority (Form PCT/ISA/237) dated Mar. 2, 2021, in corresponding International Application No. PCT/JP2019/033005. (18 pages).

(Continued)

*Primary Examiner* — Thai Pham
(74) *Attorney, Agent, or Firm* — Buchanan Ingersoll & Rooney PC

(57) ABSTRACT

A semiconductor light source includes multiple light-emitting elements coupled in series. A driving circuit receives an input voltage, and supplies a driving current to the semiconductor light source. A bypass circuit is coupled to a part of the multiple light-emitting elements. When a low-voltage state occurs, the bypass circuit is set to the enabled state, thereby bypassing the driving current. An auxiliary power supply circuit is coupled in series with the part of the multiple light-emitting elements. When an expected current does not flow through the auxiliary power supply circuit after the bypass circuit is set to the disabled state, a judgement unit judges that an open-circuit fault has occurred in the part of the multiple light-emitting elements.

16 Claims, 13 Drawing Sheets

(51) Int. Cl.
  *H05B 45/54* (2020.01)
  *B60Q 1/00* (2006.01)
  *B60Q 1/26* (2006.01)

(56) References Cited

U.S. PATENT DOCUMENTS

| | | | | |
|---|---|---|---|---|
| 2008/0197789 A1* | 8/2008 | Shiotsu | ............... | H05B 45/385 |
| | | | | 315/297 |
| 2010/0123043 A1* | 5/2010 | Neple | ............. | B32B 17/10009 |
| | | | | 244/129.3 |
| 2010/0308739 A1* | 12/2010 | Shteynberg | ............ | H05B 45/48 |
| | | | | 315/193 |
| 2015/0163871 A1* | 6/2015 | Takeshi | ................ | H05B 45/54 |
| | | | | 315/82 |
| 2016/0096467 A1* | 4/2016 | Murakami | ............ | F21S 41/148 |
| | | | | 315/82 |
| 2017/0332452 A1* | 11/2017 | Lookman | ............... | H05B 45/48 |
| 2018/0029527 A1 | 2/2018 | Kosugi et al. | | |
| 2018/0054870 A1* | 2/2018 | Yanagizu | ........... | H05B 45/3725 |

FOREIGN PATENT DOCUMENTS

| | | |
|---|---|---|
| JP | 2014-120444 A | 6/2014 |
| JP | 2016-197711 A | 11/2016 |
| JP | 2018-016191 A | 2/2018 |

OTHER PUBLICATIONS

International Search Report (Form PCT/ISA/210) dated Oct. 15, 2019, in corresponding International Application No. PCT/JP2019/033005. (4 pages).

* cited by examiner

LIGHTING CIRCUIT

BACKGROUND

1. Technical Field

The present disclosure relates to a lamp employed for an automobile or the like.

2. Description of the Related Art

As conventional light sources used for automotive lamps, in many cases, electric bulbs have been employed. In recent years, semiconductor light sources such as light-emitting diodes (LEDs) or the like are coming to be widely employed.

FIG. 1 is a block diagram showing a conventional automotive lamp 1. The automotive lamp 1 receives a DC voltage (input voltage $V_{IN}$) from a battery 2 via a switch 4. A light source 10 includes a plurality of n LEDs 12 coupled in series. The luminance of the light source 10 is controlled according to a driving current $I_{LED}$ that flows through the light source 10. A lighting circuit 20 includes an LED driver 22 that stabilizes the driving current $I_{LED}$ to a target value $I_{REF}$ that corresponds to a target luminance.

With the forward voltage applied in a state in which the driving current $I_{LED}$ that flows through the LEDs 12 is stabilized to the target value $I_{REF}$ as $Vf_0$, the voltage $V_{MIN}$ across both ends of the light source 10 (which will be referred to as a "minimum turn-on voltage") is represented by $V_{MIN}=Vf_0 \times n$. In a case in which n=3, a white-color LED requires a $V_{MIN}$ of approximately 11 V. On the other hand, a red-color LED requires a $V_{MIN}$ of approximately 9 V. In other words, when the output voltage $V_{OUT}$ of the LED driver 22 becomes lower than the minimum voltage $V_{MIN}$, the driving current $I_{LED}$ cannot be maintained at the target value $I_{REF}$, leading to a situation in which multiple LEDs 12 are turned off.

Regarding the lighting circuit 20 which is required to be configured with a low cost as with an LED socket, the LED driver 22 is configured as a constant current series regulator or a constant current output switching converter. In this case, the output voltage $V_{OUT}$ of the LED driver 22 is lower than the input voltage $V_{IN}$. In a full-charge state, the battery supplies an output voltage of 13 V. However, as the discharging of the battery advances, in some cases, the input voltage $V_{IN}$ becomes 10 V or lower. Accordingly, as the battery voltage becomes low (which will be referred to as a "low-voltage state"), this leads to a situation in which the output voltage $V_{OUT}$ is lower than the minimum turn-on voltage $V_{MIN}$. In this state, the LEDs 12 are turned off.

In order to prevent the light source 10 from turning off even in such a low-voltage state, a bypass switch 24 and a bypass control circuit 26 are provided. The bypass switch 24 is coupled in parallel with a single predetermined LED 12_n. When the input voltage $V_{IN}$ is lower than a predetermined threshold value $V_{TH}$, the bypass control circuit 26 judges that a low-voltage state has occurred, and turns on the bypass switch 24. In this state, the minimum turn-on voltage $V_{MIN}$ is represented by $V_{MIN}=Vf_0 \times (n-1)$, and accordingly, the relation $V_{IN}>V_{MIN}$ is maintained. That is to say, as a tradeoff, the LED 12_n is turned off in order to maintain the turn-on state of the remaining LEDs 12_1 through (n-1).

As a result of investigating the lighting circuit 20 shown in FIG. 1, the present inventors have recognized the following problem.

Let us consider a case in which an open-circuit fault occurs in the LED 12_n to be bypassed by the bypass switch 24. In this case, in a non-low-voltage state, the current path of the semiconductor light source 10 is disconnected, leading to a situation in which all the LEDs 12_1 through 12_n cannot be turned on. However, in a low-voltage state, the LED 12_n is bypassed, which allows the remaining LEDs 12_1 through 12_(n-1) to turn on normally. Such an operation is a problem. Also, such an arrangement has the potential to involve the user not noticing the occurrence of a malfunction in the lamp, leading to a situation in which the use of the lamp with a malfunction is continued.

SUMMARY

The present disclosure has been made in order to solve such a problem.

An embodiment of the present disclosure relates to a lighting circuit for a semiconductor light source including multiple light-emitting elements coupled in series. The lighting circuit includes: a driving circuit structured to receive an input voltage, and to supply a driving current to the semiconductor light source; a bypass circuit coupled to an element to be bypassed which is a part of the multiple light-emitting elements, and structured to be set to an enabled state when the input voltage is in a low-voltage state so as to bypass the driving current; an auxiliary power supply circuit structured to supply electric power to the element to be bypassed via a line that differs from that of the driving circuit; and a judgment unit structured to judge whether or not an open-circuit fault has occurred in the element to be bypassed based on an electrical state of the auxiliary power supply circuit when the bypass circuit is set to a disabled state.

It is to be noted that any arbitrary combination or rearrangement of the above-described structural components and so forth is effective as and encompassed by the present embodiments. Moreover, this summary does not necessarily describe all necessary features so that the disclosure may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 4 is an operation waveform diagram showing the operation of the automotive lamp shown in FIG. 2 when it is turned on;

DETAILED DESCRIPTION

Outline of the Embodiments

Figure 1:
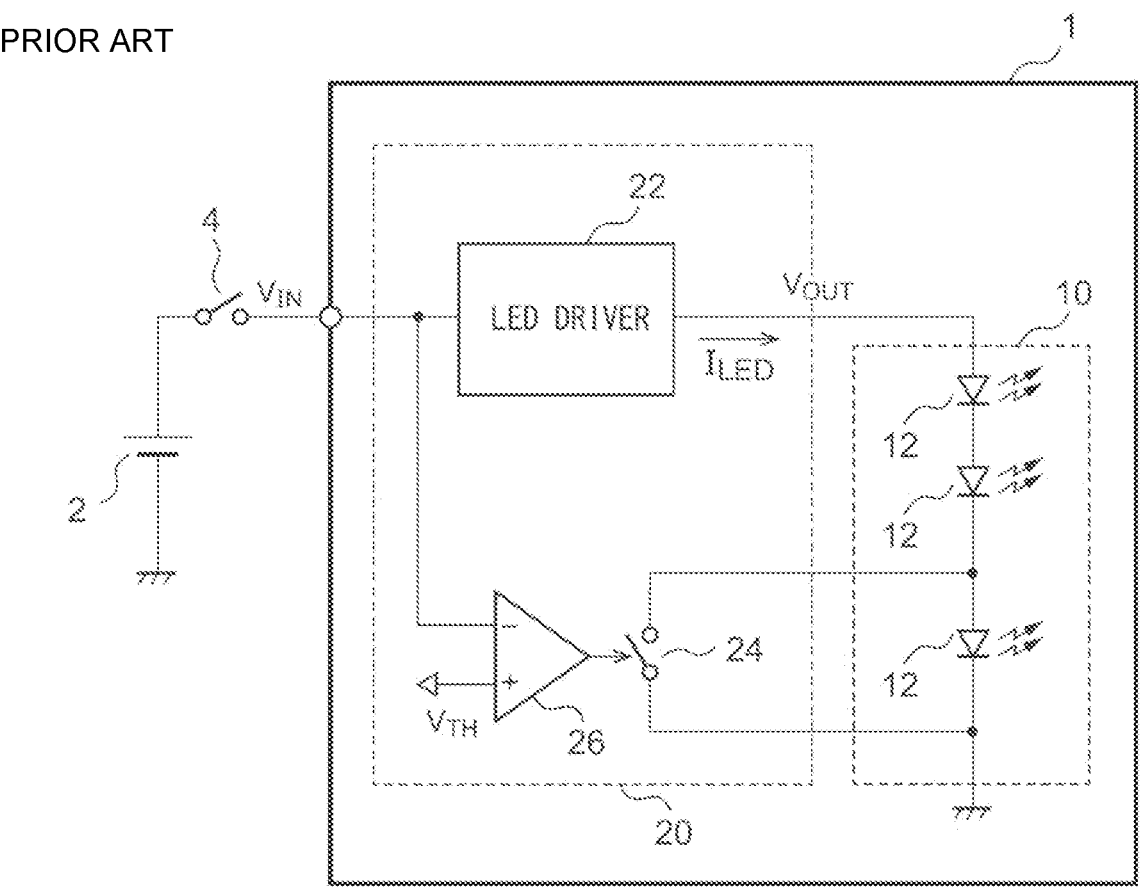
FIG. 1 is a block diagram showing a conventional automotive lamp.

An outline of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "one embodiment" may be used herein to refer to a single embodiment or multiple embodiments of the disclosure.

One embodiment disclosed in the present specification relates to a lighting circuit. The lighting circuit turns on a semiconductor light source including multiple light-emitting elements coupled in series. The lighting circuit includes a driving circuit, a bypass circuit, an auxiliary power supply circuit, and a judgment circuit. The driving circuit is configured to receive an input voltage, and to supply a driving current to the semiconductor light source. The bypass circuit is coupled to a part of the multiple light-emitting elements (an element to be bypassed). When the input voltage is in a low-voltage state, the bypass circuit is set to the enabled state, so as to bypass the driving current. The auxiliary power supply circuit is coupled in series with the element to be bypassed that is configured as a part of the multiple light-emitting elements. Furthermore, the auxiliary power supply circuit is arranged in parallel with the other part of the multiple light-emitting elements and the driving circuit. The judgment unit detects the occurrence of an open-circuit fault in the part of the multiple light-emitting element (the element to be bypassed) based on an electrical state of the auxiliary power supply circuit in the disabled state of the bypass circuit. This allows an open-circuit fault to be detected in the element to be bypassed, thereby allowing various kinds of countermeasures to be supported, examples of which include notifying the user of the occurrence of such a malfunction, limiting the operation of the lighting circuit, etc.

With an embodiment, when an expected current does not flow across the auxiliary power supply circuit, or when an expected voltage drop has not occurred across the auxiliary power supply circuit, judgment may be made that an open-circuit fault has occurred in the element to be bypassed.

In one embodiment, when judgment has been made that the element to be bypassed is in a no-open-circuit-fault state (i.e., normal state), the bypass circuit may allow it to be set to the enabled state. When the semiconductor light source cannot be turned on in the normal voltage state, this arrangement is capable of preventing the semiconductor light source from turning on in the low-voltage state.

In one embodiment, the judgment unit may make the judgment at a timing that is at least one from among (i) a timing before the electrical state becomes the low-voltage state in a period in which lighting is executed, and (ii) at a timing when the electrical state is the low-voltage state when lighting is started.

In one embodiment, the auxiliary power supply circuit may include a resistor between an input line via which the input voltage is applied and a part of the multiple light-emitting elements. This arrangement is capable of setting a current that flows across the element to be bypassed when the occurrence of an open-circuit fault is judged, according to the resistance value of the resistor.

In one embodiment, the auxiliary power supply circuit may further include a switch between an input line via which the input voltage is supplied and a part of the multiple light-emitting elements such that it is coupled in series with the resistor. This allows the auxiliary power supply circuit to be turned off completely in a normal voltage state.

In one embodiment, when a voltage drop across the resistor is lower than a predetermined threshold, the judgment unit may judge that an open-circuit fault has occurred in a part of the multiple light-emitting elements. By using the resistor for a driving operation as a current monitoring resistor, such an arrangement allows an increase in the circuit area to be suppressed.

In one embodiment, in a further low-voltage state, the lighting circuit may be structured to suspend the driving circuit, and to be capable of turning on only a part of the multiple light-emitting elements by means of the auxiliary power supply circuit.

In one embodiment, multiple elements to be bypassed may be provided. Also, the bypass circuit may include multiple bypass switches that correspond to the multiple elements to be bypassed. Also, the lighting circuit may include multiple auxiliary power supply circuits that correspond to the multiple elements to be bypassed.

In one embodiment, after all the bypass switches are set to the off state, the judgment unit may select the element to be bypassed positioned on the lowest-voltage side as the judgment target. When judgment has been made that the element to be bypassed positioned on the lowest-voltage side is operating normally, the judgment unit may select the element to be bypassed positioned on the second-lowest-voltage side as the judgment target after the bypass switch positioned on the lowest-voltage side is turned on.

In one embodiment, after all the bypass switches are set to an off state, the judgment unit may sequentially switch a judgment target in order from the element to be bypassed arranged on the lowest-voltage side toward the element to be bypassed arranged on the highest-voltage side. Also, when judgment has been made that the element to be bypassed thus selected as the judgment target is operating normally, the corresponding bypass switch may be set to the on state, and the judgment target may be switched to the next element to be bypassed. When judgment has been made that an abnormal state has occurred in a given element to be bypassed, the judgment operation may be set to a standby state while maintaining the element to be bypassed as the judgment target until it returns to the normal state.

In one embodiment, the judgment unit may sequentially switch a judgment target in order from the element to be bypassed arranged on the highest-voltage side toward the element to be bypassed arranged on the lowest-voltage side. When a given element to be bypassed is selected as the judgment target, the bypass switches arranged on a voltage side that is lower than that of the element to be bypassed thus selected as the judgment target may be set to the on state. When judgment is made that the element to be bypassed thus selected as the judgment target is operating normally, the judgement target may be switched to the next element to be bypassed. When judgment has been made that an abnormal state has occurred in a given element to be bypassed, the judgment operation may be set to a standby state while maintaining the element to be bypassed as the judgment target until it returns to the normal state.

In one embodiment, the multiple auxiliary power supply circuits may each include a current-liming resistor. The judgment unit may include: multiple comparison units arranged such that they correspond to the multiple auxiliary power supply circuits, and each structured to compare a voltage drop across the corresponding current-limiting resistor with a predetermined threshold value; and a logic circuit structured to process outputs of the multiple comparison units.

In one embodiment, the logic circuit may include: multiple flip-flops; and multiple logic gates. Each logic gate may perform a logical operation on the output of the flip-flop arranged as a previous stage and an output of the corresponding comparison unit. Also, each flip-flop may receive the output of the corresponding logic gate via an input terminal thereof.

In one embodiment, in the judgment operation of the judgment unit, the on state and the off state (on and off) of each bypass switch may be controlled according to the output of the corresponding flip-flop. This arrangement allows the elements to be bypassed to be sequentially selected as the judgment target in order from the element to be bypassed positioned on the lower side.

EMBODIMENTS

Description will be made below regarding the present disclosure based on preferred embodiments with reference to the drawings. The same or similar components, members, and processes are denoted by the same reference numerals, and redundant description thereof will be omitted as appropriate. The embodiments have been described for exemplary purposes only, and are by no means intended to restrict the present disclosure. Also, it is not necessarily essential for the present disclosure that all the features or a combination thereof be provided as described in the embodiments.

In the present specification, the state represented by the phrase "the member A is coupled to the member B" includes a state in which the member A is indirectly coupled to the member B via another member that does not substantially affect the electric connection between them, or that does not damage the functions or effects of the connection between them, in addition to a state in which they are physically and directly coupled.

Similarly, the state represented by the phrase "the member C is provided between the member A and the member B" includes a state in which the member A is indirectly coupled to the member C, or the member B is indirectly coupled to the member C via another member that does not substantially affect the electric connection between them, or that does not damage the functions or effects of the connection between them, in addition to a state in which they are directly coupled.

In the present specification, the reference symbols denoting electric signals such as a voltage signal, current signal, or the like, and the reference symbols denoting circuit elements such as a resistor, capacitor, or the like, also represent the corresponding voltage value, current value, resistance value, or capacitance value as necessary.

Figure 2:
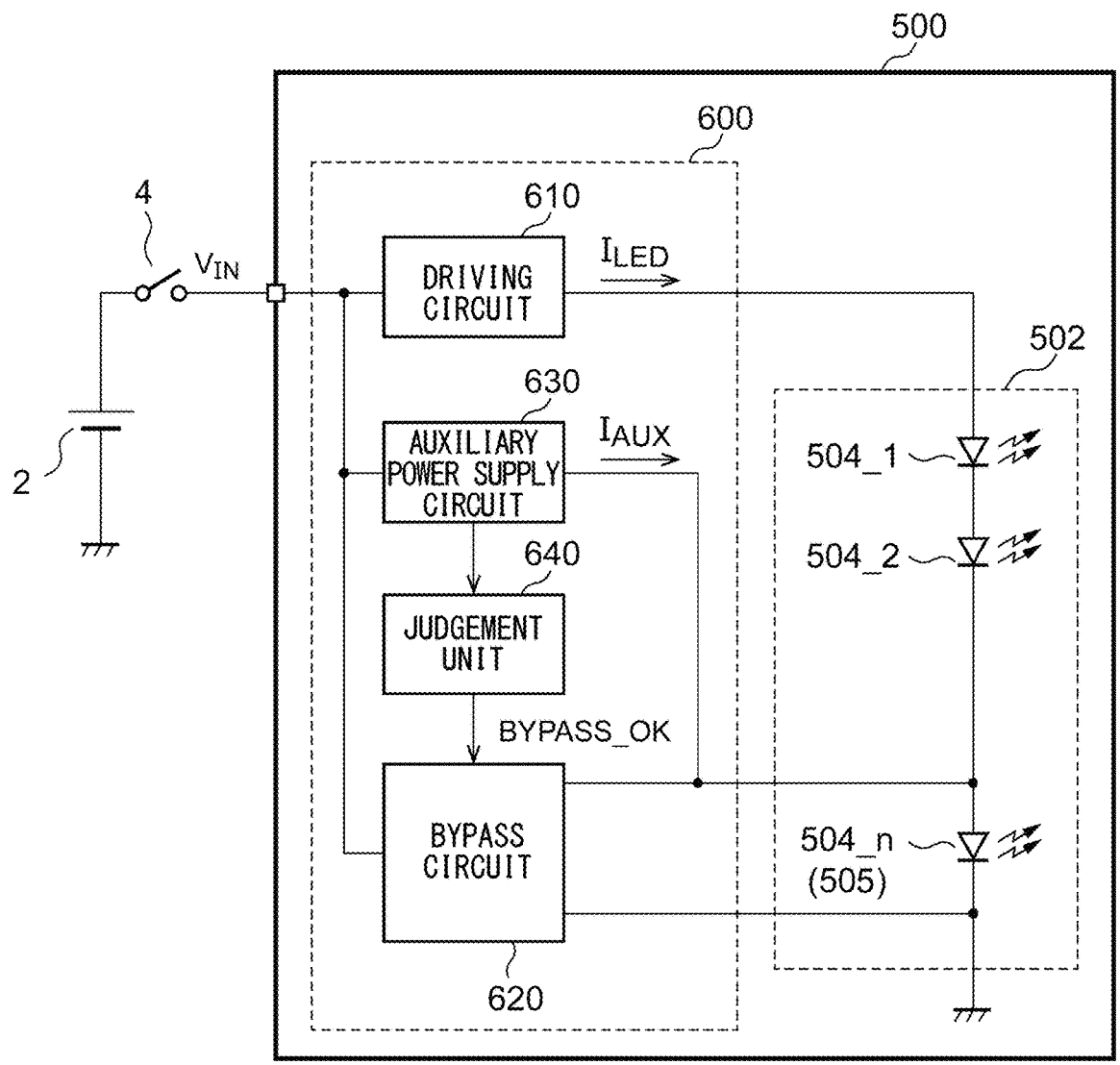
FIG. 2 is a block diagram showing an automotive lamp including a lighting circuit according to an embodiment.

FIG. 2 is a block diagram showing an automotive lamp 500 including a lighting circuit 600 according to an embodiment. The automotive lamp 500 receives the supply of a DC voltage (input voltage) $V_{IN}$ from a battery 2 via a switch 4. The automotive lamp 500 includes a semiconductor light source 502 and a lighting circuit 600. The semiconductor light source 502 includes a plurality of n (n≥2) light-emitting elements 504_1, 504_2, . . . , 504_n coupled in series. FIG. 2 shows an example in which n=3. As such a light-emitting element 504, an LED is preferably employed, for example. However, the present disclosure is not restricted to such an example. Also, a laser diode (LD) or an organic EL element may be employed. The automotive lamp 500 is configured as a stop lamp or a tail lamp, for example. The semiconductor light source 502 may be configured as a red-color LED. A suitable embodiment of the automotive lamp 500 is configured as an LED socket in which the semiconductor light source 502 and the lighting circuit 600 are housed in a single package. Such an LED socket has a structure that allows it to be detachably mounted on an unshown lamp body. It is needless to say that such an LED socket is required to have a long operating life. In addition, the LED socket, which is used as a consumable, is also required to be provided with a low cost.

The lighting circuit 600 includes a driving circuit 610, a bypass circuit 620, an auxiliary power supply circuit 630, and a judgment unit 640.

The driving circuit 610 receives the input voltage $V_{IN}$, stabilizes a driving current $I_{LED}$ to a target value $I_{REF}$, and supplies the driving current $I_{LED}$ thus stabilized to the semiconductor light source 502. The driving circuit 610 may be configured as any one from among (i) a constant current linear regulator, (ii) a step-down switching converter that supports constant current output, and (iii) a combination of a step-down switching converter that supports constant voltage output and a constant current circuit.

The bypass circuit 620 is coupled to at least one (504_3) from among multiple light-emitting elements 504. The light-emitting element 504_3 will also be referred to as an "element 505 to be bypassed". The bypass circuit 620 is switchable between an enabled state (connection state) and a disabled state (disconnection state). In the enabled state, the driving current $I_{LED}$ is bypassed. The bypass circuit 620 is capable of detecting the occurrence of the low-voltage state based on the magnitude relation between the input voltage $V_{IN}$ and a predetermined or a variable threshold value $V_{TH}$. Upon detecting the occurrence of the low-voltage state ($V_{IN}<V_{TH}$), the bypass circuit 620 is set to the enabled state. Upon detecting a normal voltage state ($V_{IN}>V_{TH}$), the bypass circuit 620 is set to the disabled state.

The auxiliary power supply circuit 630 is coupled in series to the element 505 to be bypassed. In the normal state, the element 505 to be bypassed receives the supply of power from the driving circuit 610, thereby providing a driving current $I_{LED}$ flowing through the element 505 to be bypassed. In the operation for detecting the occurrence of an open-circuit fault, the element 505 to be bypassed receives the supply of power from the auxiliary power supply circuit 630, thereby providing an auxiliary current $I_{AUX}$ flowing through the element 505 to be bypassed.

The auxiliary current $I_{AUX}$ is designed to be a sufficiently small value such that the element 505 to be bypassed does not emit light with high luminance due to the flow of the auxiliary current $I_{AUX}$, i.e., such that its current value is sufficiently smaller than the target value $I_{REF}$ of the driving current $I_{LED}$. It should be noted that, in order to have no effect on the luminance provided by the element 505 to be bypassed in the normal voltage state, the auxiliary current $I_{AUX}$ is preferably designed such that it only flows during a judgment period provided by the judgment unit 640. That is to say, the auxiliary current $I_{AUX}$ is preferably designed such that its path is disconnected in a period other than the judgement period.

The judgement unit 640 detects the occurrence of an open-circuit fault in the element 505 to be bypassed. Specifically, before the judgment of whether or not an open-circuit fault has occurred, the judgement unit 640 sets the bypass circuit 620 to the disabled state. In this state, when the current that flows across the auxiliary power supply circuit does not match an expected value, the judgement unit 640 judges that an open-circuit fault has occurred. Conversely, when the current that flows across the auxiliary power supply circuit matches the expected value, the judgment unit 640 judges that the element 505 to be bypassed is operating normally.

The judgment unit 640 makes the above-described judgment at either (i) a timing before the voltage state becomes the low-voltage state during a period in which the semiconductor light source 502 is turned on, or (ii) a timing when the voltage state is the low-voltage state at the start time of turning on the semiconductor light source 502. Preferably, the judgment unit 640 makes the above-described judgment at both the timings described above.

When the judgment unit 640 has judged that the element 505 to be bypassed is operating normally, the judgment unit 640 may assert an permission signal BYPASS_OK. When judgment has been made that the element 505 to be bypassed is operating normally, i.e., when the permission signal BYPASS_OK is asserted, this enables the bypass circuit 620 to set the enabled state. When judgment has been made that an open-circuit fault has occurred in the element 505 to be bypassed, the bypass circuit 620 maintains the disabled state.

Also, upon detecting the occurrence of an open-circuit fault, the judgment unit 640 may assert a flag (interrupt signal) FAIL that indicates the occurrence of an abnormal state of the semiconductor light source 502. Also, the automobile lamp 500 may notify an external microcontroller (ECU on the vehicle side) of the occurrence of an open-circuit fault.

The above is the configuration of the automotive lamp 500. Next, description will be made regarding the operation thereof.

Figure 3A:
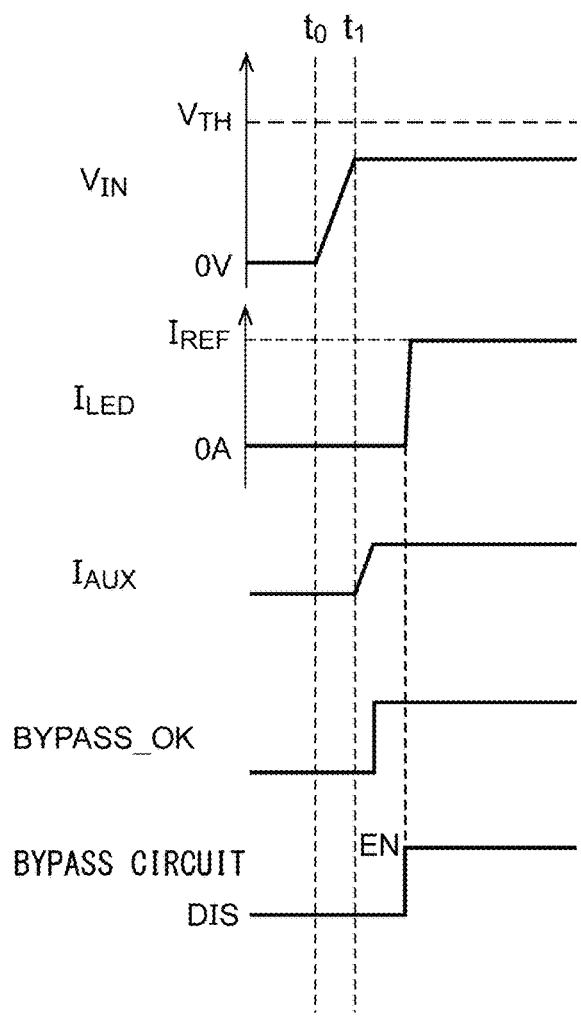
FIGS. 3A and 3B are operation waveform diagrams each showing the operation of the automotive lamp shown in FIG. 2 at the start time of turning on the automotive lamp.
Figure 3B:
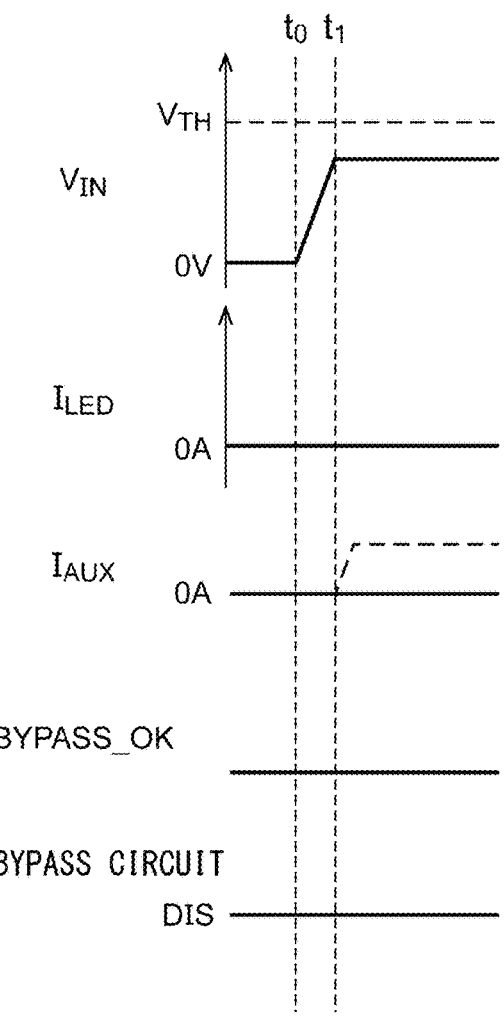

FIGS. 3A and 3B are operation waveform diagrams each showing an operation at the start time of turning on the automotive lamp 500 shown in FIG. 2. First, description will be made with reference to FIG. 3A regarding the operation when the element 505 to be bypassed is operating normally.

When the switch 4 is turned on at the time point $t_0$, the input voltage $V_{IN}$ is supplied. The input voltage $V_{IN}$ is lower than a threshold voltage $V_{TH}$, i.e., the voltage state is the low-voltage state. In this state, the permission signal BYPASS_OK is set to the low level, which sets the bypass circuit 620 to the disabled state.

When $V_{IN} < V_{TH}$, the output voltage $V_{OUT}$ of the driving circuit 610 is lower than the minimum turn-on voltage $V_{IN}$ ($=3 \times Vf_0$), and accordingly, the driving current $I_{LED}$ is in the vicinity of zero.

At the time point $t_1$, in order to provide the judgment operation of the judgment unit 640, the auxiliary power supply circuit 630 is turned on (on state). In this example, the element 505 to be bypassed is operating normally.

Accordingly, an auxiliary current $I_{AUX}$ flows across the auxiliary power supply circuit 630 and the element 505 to be bypassed. When the judgment unit 640 detects that a non-zero auxiliary current $I_{AUX}$ has flowed, the judgment unit 640 asserts the permission signal BYPASS_OK. When the permission signal BYPASS_OK is asserted, the bypass circuit 620 transits to the enabled state. In this state, the element 505 to be bypassed is bypassed. With this, the minimum turn-on voltage $V_{MIN}$ is set to $V_{MIN} = 2 \times Vf_0$. In this state, the relation $V_{OUT} > 2 \times Vf_0$ holds true. This allows the driving circuit 610 to stabilize the driving current $I_{LED}$ to a target value $I_{REF}$, thereby turning on the light-emitting elements 504_1 and 504_2.

Next, description will be made with reference to FIG. 3B regarding the operation when an open-circuit fault has occurred in the element 505 to be bypassed.

The operation before the time point $t_1$ is the same as that described above with reference to FIG. 3A. At the time point $t_0$, an input voltage $V_{IN}$ that is lower than the threshold $V_{TH}$ is supplied. In this state, the permission signal BYPASS_OK is set to the low level, which sets the bypass circuit 620 to the disabled state.

At the time point $t_1$, in order to provide the judgment operation of the judgment unit 640, the auxiliary power supply circuit 630 is turned on (on state). When an open-circuit fault has occurred in the element 505 to be bypassed, the auxiliary current $I_{AUX}$ remains at zero. Accordingly, the judgment unit 640 does not detect the non-zero auxiliary current $I_{AUX}$. Accordingly, the judgment unit 640 maintains the permission signal BYPASS_OK in the negated state. In this state, the permission signal BYPASS_OK is negated, and accordingly, the bypass circuit 620 does not transit to the enabled state. Accordingly, the minimum turn-on voltage $V_{MIN}$ of the semiconductor light source 502 remains at ($3 \times Vf_0$). In this state, the output voltage $V_{OUT}$ is insufficient. This sets the driving current $I_{LED}$ to a value in the vicinity of substantially zero, thereby maintaining the off state of the semiconductor light source 502.

Figure 4:
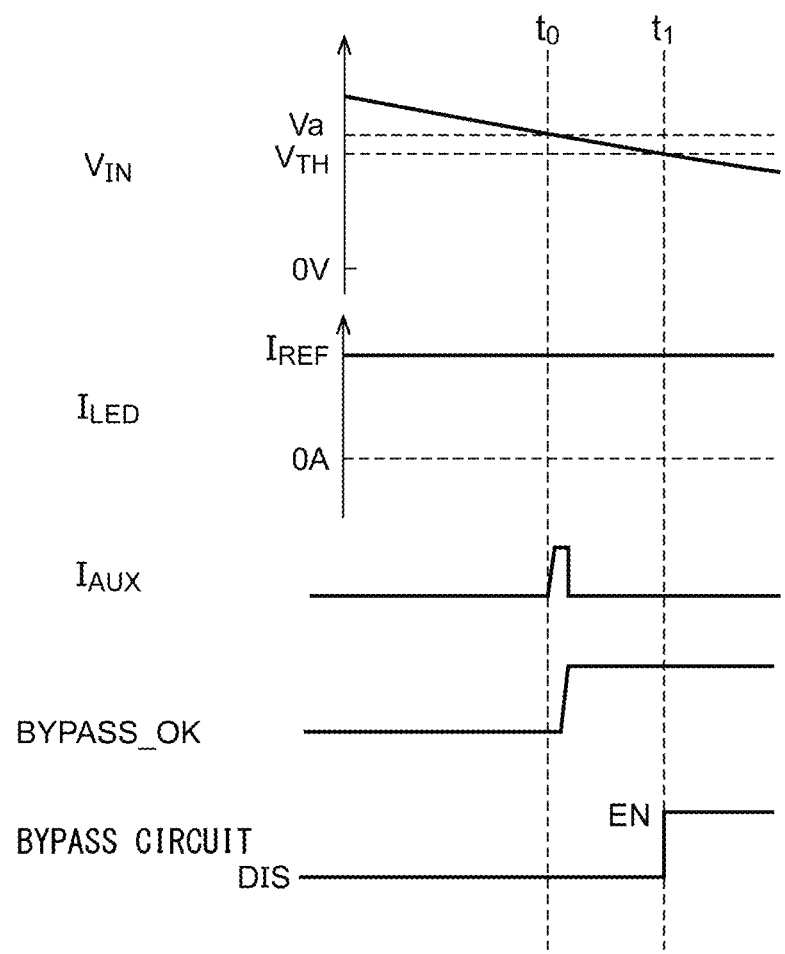

FIG. 4 is an operation waveform diagram showing the operation of the automotive lamp 500 shown in FIG. 2 when it is turned on. FIG. 4 shows the operation when the element 505 to be bypassed is operating normally.

Before the time point $t_1$, the voltage state is the normal voltage state ($V_{IN} > V_{TH}$). In this state, the bypass circuit 620 is disabled. The driving current $I_{LED}$ generated by the driving circuit 610 is stabilized to the target value $I_{REF}$, thereby turning on all the light-emitting elements 504_1 through 504_3. The auxiliary power supply circuit 630 is disconnected, thereby setting the auxiliary current $I_{AUX}$ to zero.

The input voltage $V_{IN}$ decreases with time. At the time point $t_1$, the input voltage $V_{IN}$ becomes lower than the threshold value $V_{TH}$. At the time point $t_0$ before the time point $t_1$, the judgment unit 640 judges whether or not an open-circuit fault has occurred, with the input voltage $V_{IN}$ becoming lower than a threshold value Va ($Va > V_{TH}$) as a trigger.

In order to provide the open-circuit fault judgment operation of the judgment unit 640, the auxiliary power supply circuit 630 is turned on (on state). In this example, the element 505 to be bypassed is operating normally. Accordingly, an auxiliary current $I_{AUX}$ flows across the auxiliary power supply circuit 630 and the element 505 to be bypassed. Upon detecting the flow of the non-zero auxiliary current $I_{AUX}$, the judgment unit 640 asserts the permission signal BYPASS_OK. After the judgment, the auxiliary power supply circuit 630 is disconnected (off state). Accordingly, the auxiliary current $I_{AUX}$ becomes zero.

When the permission signal BYPASS_OK is asserted, this enables the bypass circuit 620 to be set to the enabled state. Subsequently, when the input voltage $V_{IN}$ becomes lower than the threshold voltage $V_{TH}$ at the time point $t_1$, the bypass circuit 620 transits to the enabled state, which bypasses the element 505 to be bypassed. In this state, the relation $V_{MIN}=2\times Vf_0$ holds true, thereby satisfying the relation $V_{OUT}>2\times Vf_0$. Accordingly, the driving current $I_{LED}$ returns to the target value $I_{REF}$, thereby turning on the light-emitting elements 504_1 and 504_2.

The above is the operation of the automotive lamp 500. The automotive lamp 500 is capable of detecting the occurrence of an open-circuit fault in the element 505 to be bypassed. This enables various kinds of countermeasures such as notifying the user of the occurrence of a malfunction, limiting the operation of the lighting circuit, etc.

When the occurrence of an open-circuit fault is detected, the bypass circuit 620 is prohibited from being set to the enabled state. Such an arrangement is capable of preventing a situation in which the semiconductor light source 502 can be turned on in the low-voltage state while the semiconductor light source 502 cannot be turned on in the normal voltage state. Accordingly, when an open-circuit fault occurs in the element 505 to be bypassed, the semiconductor light source 502 is turned off in both the normal voltage state and the low-voltage state. This allows the user to notice the occurrence of an abnormal state in the automotive lamp 500.

The present disclosure encompasses various kinds of apparatuses and methods that can be regarded as a block configuration or a circuit configuration shown in FIG. 2, or otherwise that can be derived from the aforementioned description. That is to say, the present disclosure is not restricted to a specific configuration. More specific description will be made below regarding an example configuration or an example for clarification and ease of understanding of the essence of the present disclosure and the operation thereof. That is to say, the following description will by no means be intended to restrict the technical scope of the present disclosure.

First Example

Figure 5:
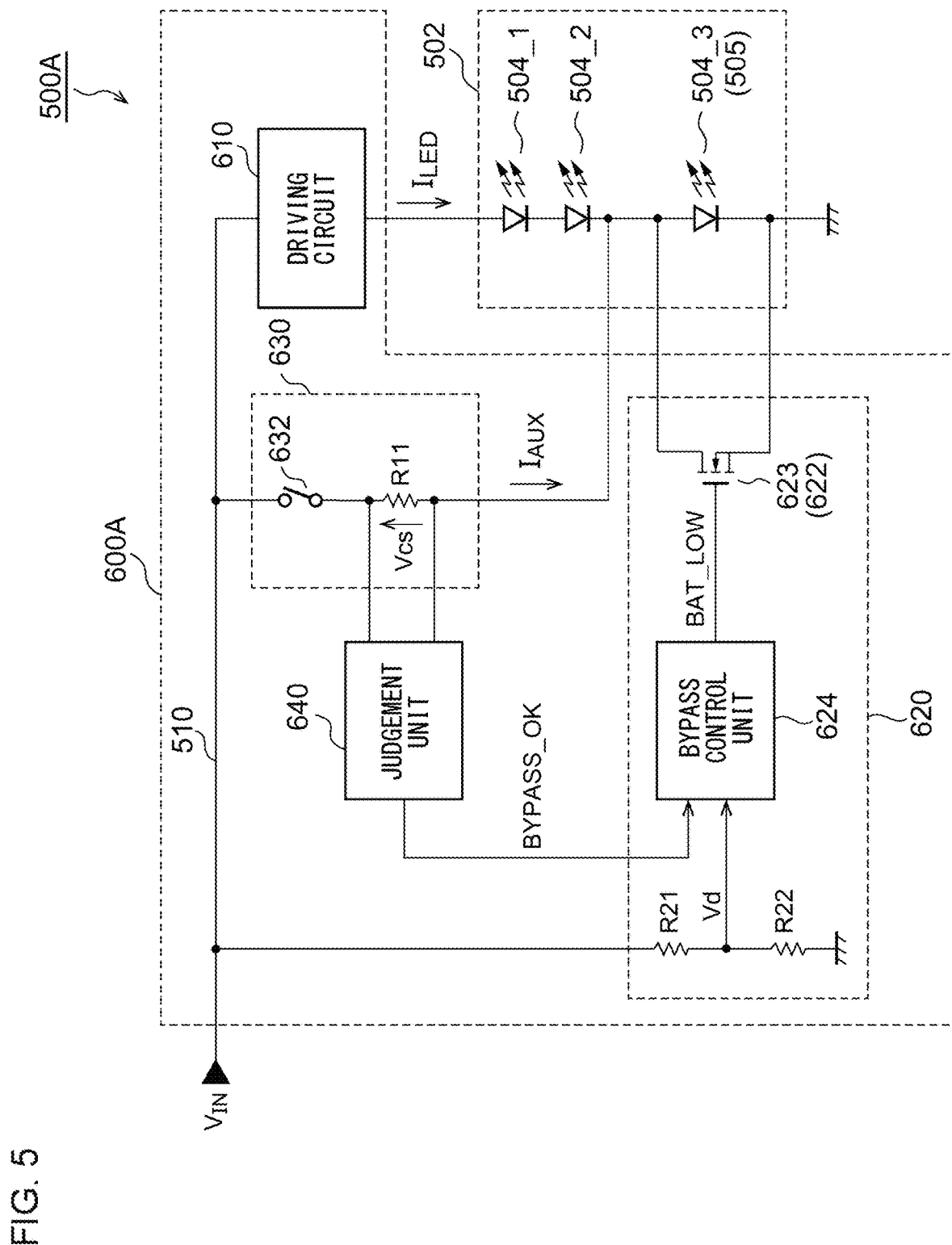
FIG. 5 is a block diagram showing an automotive lamp including a lighting circuit according to a first example.

FIG. 5 is a block diagram showing an automotive lamp 500A including a lighting circuit 600A according to a first example. The bypass circuit 620 includes a bypass switch 622 and a bypass control unit 624. The bypass switch 622 includes a bypass transistor 623 coupled in parallel with the element 505 to be bypassed. The bypass control unit 624 controls the connection state and the disconnection state (on and off) of the bypass switch 622. The connection state of the bypass switch 622 corresponds to the enabled state of the bypass circuit 620. The disconnection state of the bypass switch 622 corresponds to the disabled state of the bypass circuit 620.

Resistors R21 and R22 divide the input voltage $V_{IN}$. The bypass control unit 624 compares the input voltage (detection voltage Vd) thus divided with a threshold value $V_{TH}'$. When Vd<$V_{TH}'$ holds true, i.e., when the voltage state is the low-voltage state, the bypass control unit 624 sets the control signal BAT LOW to the high level, thereby turning on the bypass switch 622. Conversely, when Vd>Vth', i.e., when the voltage state is the normal voltage state, the bypass control unit 624 sets the control signal BAT LOW to the low level, thereby turning off the bypass switch 622.

The bypass control unit 624 may switch the state via a state in which a part of the driving current $I_{LED}$ is bypassed via the bypass switch 622, at a timing at which the bypass switch 622 is switched from the off state to the on state or from the on state to the off state based on the input voltage $V_{IN}$ (detection voltage Vd). That is to say, the enabled state of the bypass circuit 620 includes such a state in which a part of the driving current $I_{LED}$ is bypassed.

The auxiliary power supply circuit 630 includes a resistor R11 configured as a current-limiting element and a switch 632. The current-limiting resistor R11 is provided between the element 505 to be bypassed and an input line 510 via which the input voltage $V_{IN}$ is to be supplied. The switch 632 is arranged in series with the current-limiting resistor R11. The switch 632 is arranged in order to control the connection state and the disconnection state of the auxiliary power supply circuit 630. The switch 632 may be configured such that it is only turned on during the judgment operation of the judgment unit 640, and such that it is turned off after the judgment operation.

Alternatively, in a case in which the driving circuit 610 is configured to be switchable between the on state and the off state (i.e., on/off of the driving current $I_{LED}$), the switch 632 may be on/off controlled in conjunction with the on/off switching of the driving circuit 610.

With the forward voltage of the element 505 to be bypassed as $Vf_0$, assuming that the element 505 to be bypassed is operating normally, the current value, i.e., the expected value, of the auxiliary current $I_{AUX}$ is represented by the following Expression.

$$I_{AUX}=(V_{IN}-Vf_0)/R11$$

The voltage drop across the current-limiting resistor R11 is proportional to the auxiliary current $I_{AUX}$. Accordingly, the judgment unit 640 is capable of judging whether or not the auxiliary current $I_{AUX}$ flows based on the voltage drop $V_{cs}$ across the current-limiting resistor R11. When the voltage drop $V_{cs}$ is lower than a predetermined threshold value, the judgment unit 640 may judge that an open-circuit fault has occurred. With this arrangement, the current-limiting resistor R11 for the driving operation is also used as a current monitoring resistor. This allows an increase of the circuit area to be suppressed.

Second Example

Figure 6:
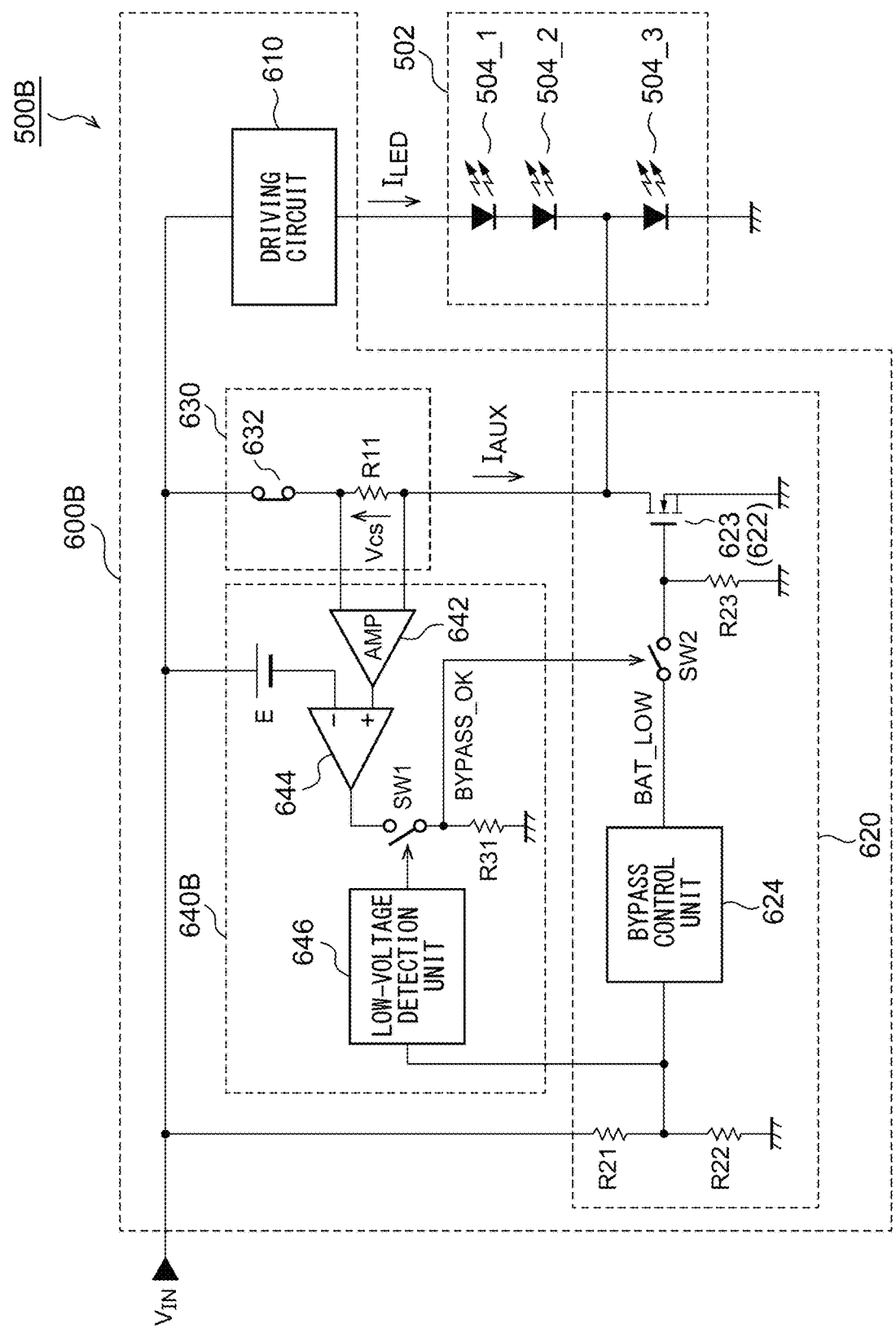
FIG. 6 is a block diagram showing an automotive lamp including a lighting circuit according to a second example.

FIG. 6 is a block diagram showing an automotive lamp 500B including a lighting circuit 600B according to a second example. The bypass switch 620 includes a switch SW2 and a resistor R23. When the permission signal BYPASS_OK is asserted, the switch SW2 is turned on. In this state, the bypass switch 622 is on/off controlled according to an output BAT LOW of the bypass control unit 624. When the permission signal BYPASS_OK is negated, the switch SW2 is turned off. In this state, the gate of the bypass switch 622 is pulled down via the resistor R23, thereby turning off the bypass switch 622.

The switch SW2 and the resistor R23 may be replaced by a logic gate arranged such that it receives the permission signal BYPASS_OK and the control signal BAT LOW, and with its output coupled to the gate of the bypass transistor 623.

A judgment unit 640B includes an amplifier 642, a voltage comparator 644, a switch SW1, a resistor R31, and a low-voltage detection unit 646. The amplifier 642 amplifies the voltage drop $V_{cs}$ across the current-limiting resistor R11. The voltage comparator 644 compares the voltage drop $V_{cs}'$ thus amplified with a threshold voltage E. When $V_{cs}' > E$, the voltage comparator 644 outputs the high level. Conversely, when $V_{cs}' < E$, the voltage comparator 644 outputs the low level. The low voltage detection unit 646 judges based on the detection voltage Vd whether or not the voltage state can transit to the low-voltage state. As such a state in which "the voltage state can transit to the low-voltage state", a state may be employed as described above with reference to FIG. 4 in which the input voltage $V_{IN}$ is lower than a threshold value Va that is slightly higher than the threshold value $V_{TH}$. When the voltage state has the potential to transit the low-voltage state, the switch SW1 is turned on. In this state, the output of the voltage comparator 644 is output as the permission signal BYPASS_OK. In the normal voltage state, the switch SW1 is turned off. In this state, the permission signal BYPASS_OK is pulled down via the resistor R31, and accordingly, the permission signal BYPASS_OK is fixed to the low level.

Also, the low voltage detection unit 646 may be omitted. In this case, the control signal BAT LOW generated by the bypass control unit 624 may be used to control the switch SW1.

Third Example

Figure 7:
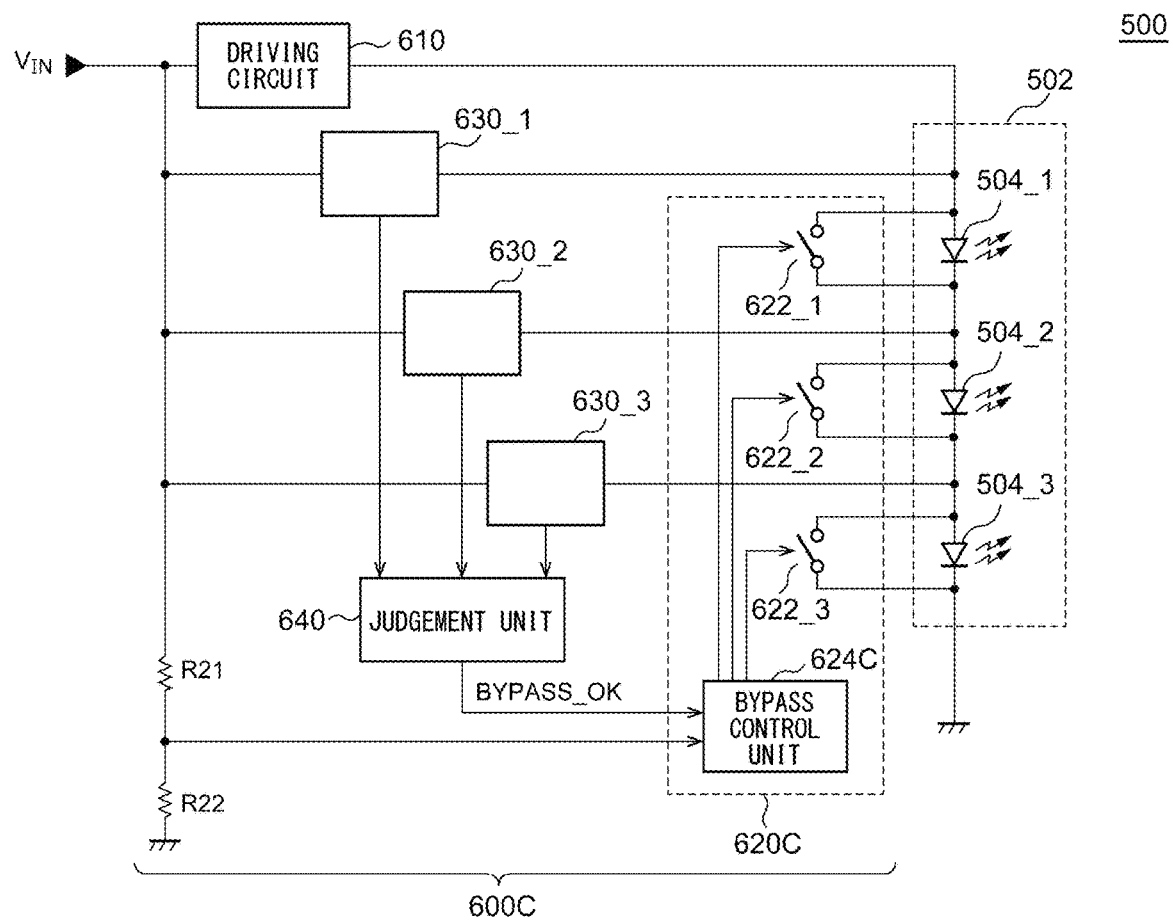
FIG. 7 is a block diagram showing an automotive lamp including a lighting circuit according to a third example.

Description has been made above regarding an example in which only a single element to be bypassed is provided. Also, multiple (m≥2) elements to be bypassed may be provided. FIG. 7 is a block diagram showing an automotive lamp 500C including a lighting circuit 600C according to a third example. All the multiple (m=3) light-emitting elements 504_1 through 504_3 are each configured as an element to be bypassed. That is to say, each light-emitting element can be individually bypassed. The bypass circuit 620C includes multiple bypass switches 622_1 through 622_3 that correspond to the multiple elements to be bypassed, and a bypass control unit 624C. It should be noted that each bypass switch 622 may be configured as a transistor.

The bypass control unit 624C increases the number k (0≤k≤m) of the bypass switches 622 to be set to the on state, i.e., the number of the light-emitting elements 504 to be bypassed, according to a decrease of the input voltage $V_{IN}$. The bypass control unit 624 may switch the k bypass switches by rotation in a time-sharing manner at a high speed in a period in which the k bypass switches are to be turned on. This arrangement is capable of switching the light-emitting elements 504 to be turned off in a time-sharing manner. In a case in which the multiple light-emitting elements 504 are arranged on the same plane, and in a case in which the light-emitting elements 504 set to the off state are fixed, this causes the occurrence of uneven luminance. By switching the light-emitting elements to be turned off by rotation, this arrangement is capable of suppressing the occurrence of uneven luminance.

The lighting circuit 600C includes multiple auxiliary power supply circuits 630_1 through 630_3 that correspond to the multiple elements 504_1 through 504_3 to be bypassed. Each auxiliary power supply circuit 630_# ("#"=1, 2, 3) is configured to supply electric power to the corresponding light-emitting element 504_# via a line that differs from that via which electric power is supplied to the driving circuit 610. With this arrangement, the occurrence of an open-circuit fault can be detected in each of the light-emitting elements 504_1 through 504_3.

The judgment unit 640C may judge the occurrence of an abnormal state in the multiple light-emitting elements 504_1 through 504_3 according to the following sequence.

Step I

All the bypass switches 622_1 through 622_3 are set to the off state. The element 504_3 to be bypassed, which is positioned on the lowest-voltage side, is employed as the judgment target. Specifically, the judgment unit 640C judges the presence or absence of an abnormal state of the light-emitting element 504_3 based on the electrical state of the auxiliary power supply circuit 630_3.

Step II

When judgment has been made that the lowest-voltage-side element 504_3 to be bypassed is in the no-open-circuit-fault state (normal state), the bypass switch 622_3, which is positioned on the lowest-voltage side, is set to the on state, and the remaining bypass switches 622_1 and 622_2 are maintained in the off state. Subsequently, the element 504_2 to be bypassed, which is positioned on the second-lowest-voltage side, is employed as the judgment target.

Specifically, the judgment unit 640C judges the presence or absence of an abnormal state of the light-emitting element 504_2 based on the electrical state of the auxiliary power supply circuit 630_2.

Step III

When judgment has been made that the element 504_2 to be bypassed is in the no-open-circuit-fault state (normal state), the bypass switch 622_2 is switched to the off state. In this stage, only the bypass switch 622_1 is set to the off state. Subsequently, the element 504_1 to be bypassed, which is positioned on the third-lowest-voltage side (the highest-voltage side), is employed as the judgment target. Specifically, the judgment unit 640C judges the presence or absence of an abnormal state of the light-emitting element 504_1 based on the electrical state of the auxiliary power supply circuit 630_1.

When the occurrence of an abnormal state has been detected in the light-emitting element 504 employed as the judgment target in any one from among STEP I through STEP III, the flow does not proceed to the next step. That is to say, the judgment sequence is suspended.

Figure 8:
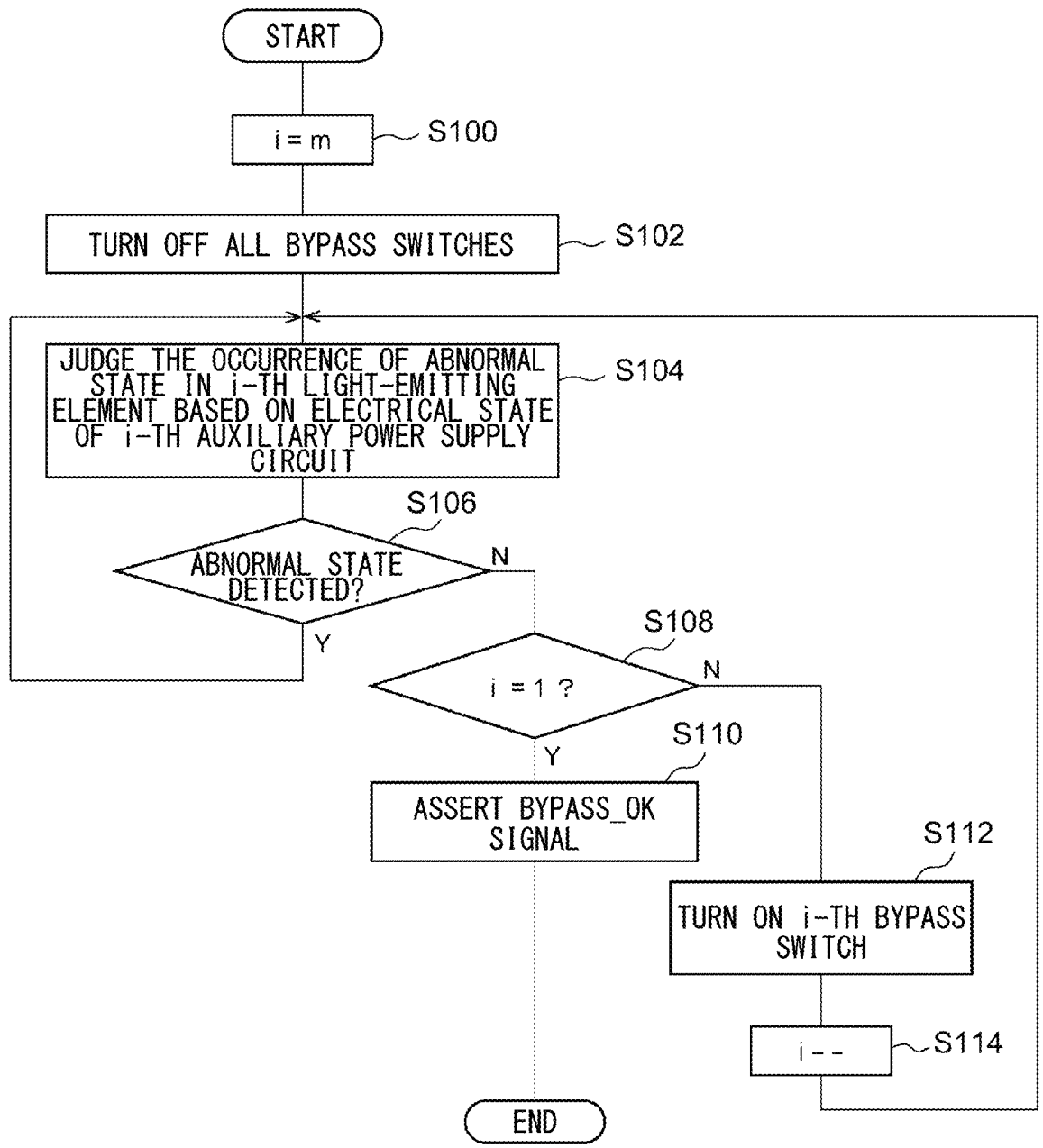
FIG. 8 is a flowchart showing an open-circuit fault judgment operation.

FIG. 8 is a flowchart showing the open-fault judgment operation. First, the variable i is initialized to m (S100). Subsequently, all the bypass switches 622_1 through 622_m are turned off (S102). Subsequently, judgment is made regarding the presence or absence of an open-circuit fault of the i-th light-emitting element 504_i based on the electrical state of the i-th auxiliary power supply circuit 630_i (S104). When judgment is made that an abnormal state has occurred ("YES" in S106), the flow returns to Step S104. That is to say, the flow is set to the standby state up to the judgment of a normal state.

When judgment has been made that the normal state has been detected ("NO" in S106), and when i=1 ("YES" in S108), i.e., when judgment has been made that all the light-emitting elements 504 are operating normally, the permission signal BYPASS_OK is asserted (S110), and the processing ends. When i>2 ("NO" in S108), the judgment target is switched to the next light-emitting element 504.

Specifically, the i-th bypass switch 622_i is turned on (S112), i is decremented by (S114), and the flow returns to Step S104.

Figure 9:
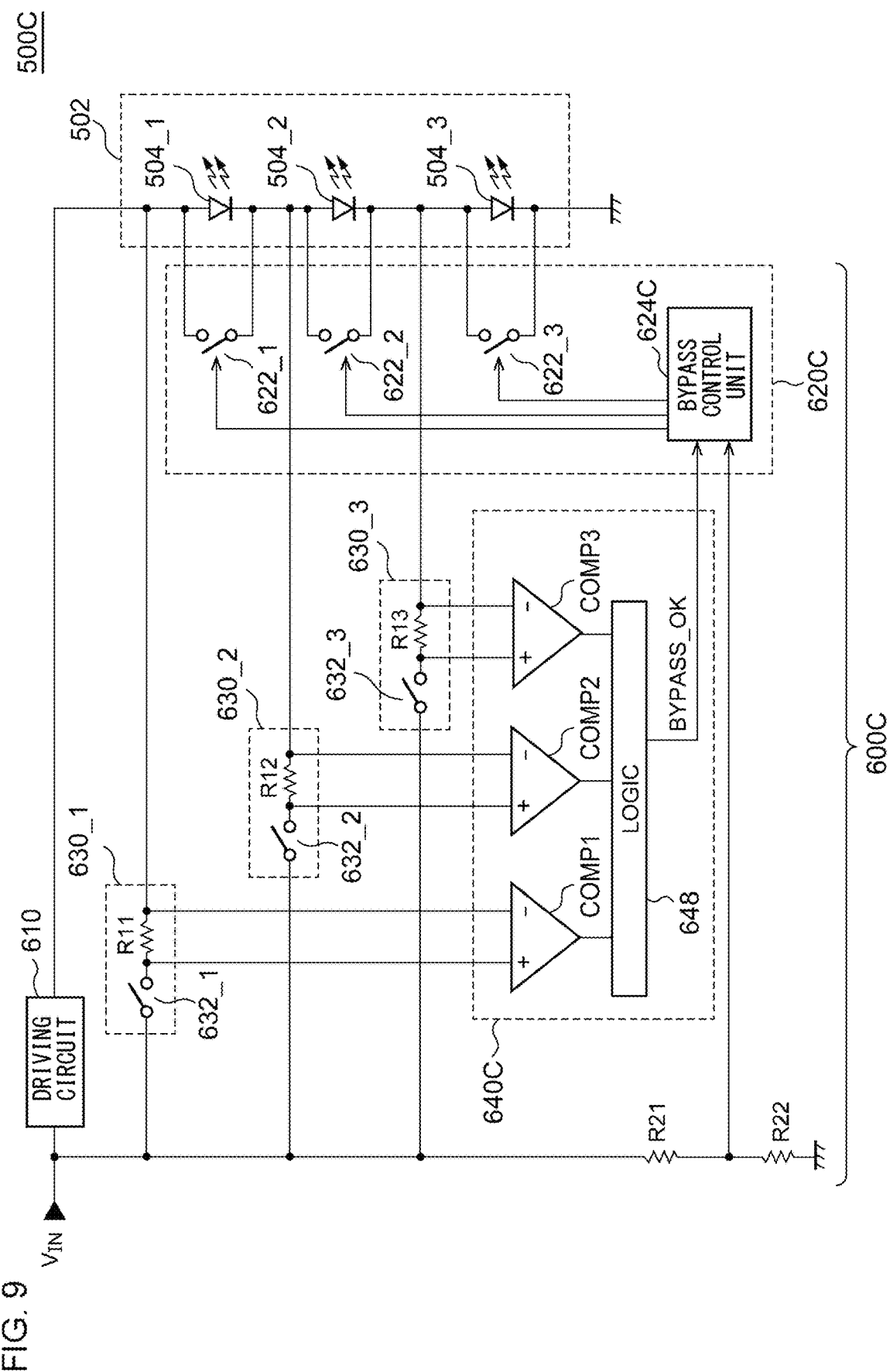
FIG. 9 is a circuit diagram showing an example configuration of a lighting circuit.

FIG. 9 is a circuit diagram showing an example configuration of the lighting circuit 600C. Each auxiliary power supply circuit 630_# ("#"=1, 2, 3) includes a resistor R1# and a switch 632_#. The judgment unit 640C includes multiple comparison units COMP1 through COMP3 and a logic circuit 648. The comparison units COMP# correspond to the amplifiers 642 and 644 shown in FIG. 6. Each comparison unit COMP# compares the voltage drop across the corresponding resistor R1# with a predetermined threshold value. The logic circuit 648 generates the permission signal BYPASS_OK based on the outputs S11 through S13 of the multiple comparison units COMP1 through COMP3.

Figure 10:
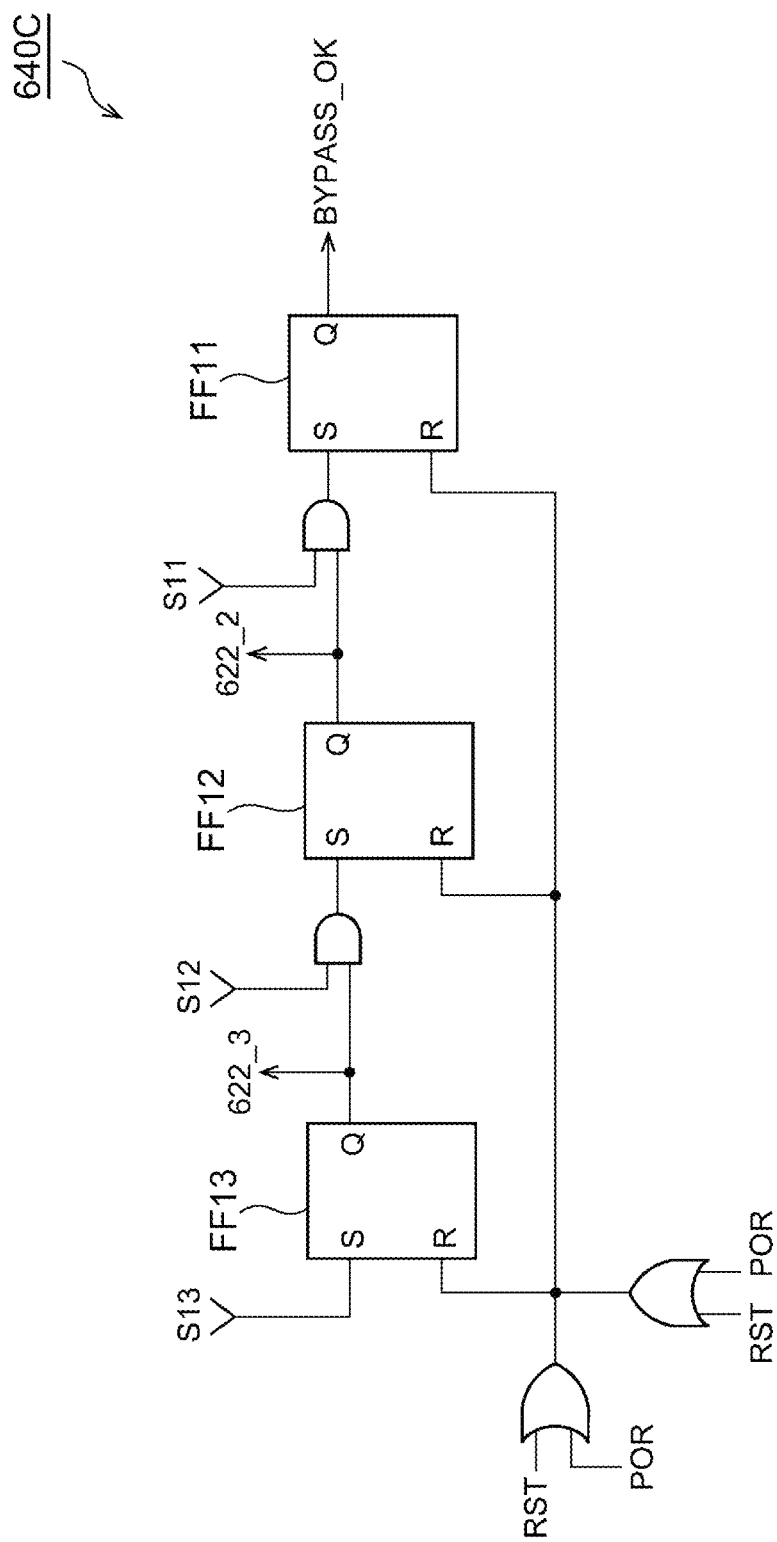
FIG. 10 is a circuit diagram showing a first example configuration of a judgment unit.

FIG. 10 is a circuit diagram showing a first example configuration of the judgment unit 640C. The judgment unit 640C includes multiple m (m=3) SR flip-flops FF11 through FF1m and multiple (m−1) AND gates A1 through Am−1. Each AND gate Ai generates the logical AND of the output of the previous-stage flip-flop FF1 (i−1) and the output S1i of the comparison unit COMPi. The logical OR of the power-on reset signal POR and the reset signal RST is input to the reset terminal of each of the flip-flops FF1 through FF3. When the power supply voltage $V_{IN}$ is sufficiently high, i.e., when no light-emitting element is required to be bypassed, the reset signal RST is asserted (high level).

The output S1m of the m-th comparison unit COMPm is input to the set terminal of the flip-flop FF1m. Furthermore, the set terminal of each flip-flop FF1i (1≤i≤m−1) is coupled to the output of the AND gate Ai. The output of the flip-flop FF11 is employed as the permission signal BYPASS_OK.

Figure 11:
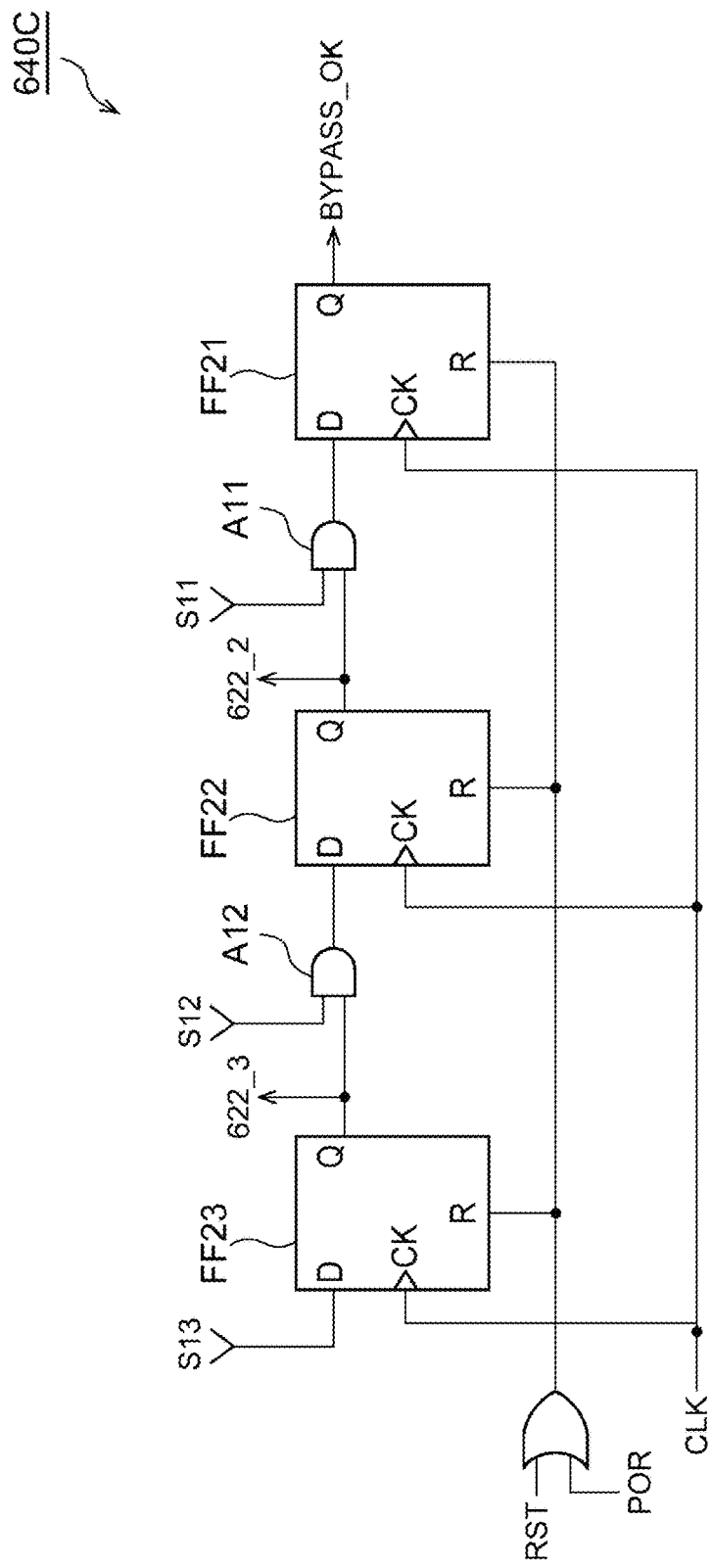
FIG. 11 is a circuit diagram showing a second example configuration of a judgment unit.

It should be noted that the outputs of the flip-flops F12 through F1m may be employed as the control signals for the multiple bypass switches 622_2 through 622_m in the judgment state. In this case, the judgment unit 640C also has a function as the bypass control unit 624C FIG. 11 is a circuit diagram showing a second example configuration of the judgment unit 640C. The judgment unit 640C has the same configuration as that shown in FIG. 10 except that the D flip-flops FF21 through FF2m are employed instead of the SR flip-flops FF11 through FF1m. A clock signal having a predetermined frequency is supplied to the clock terminal of each of the D flip-flops FF21 through FF2m.

Fourth Example

Figure 12:
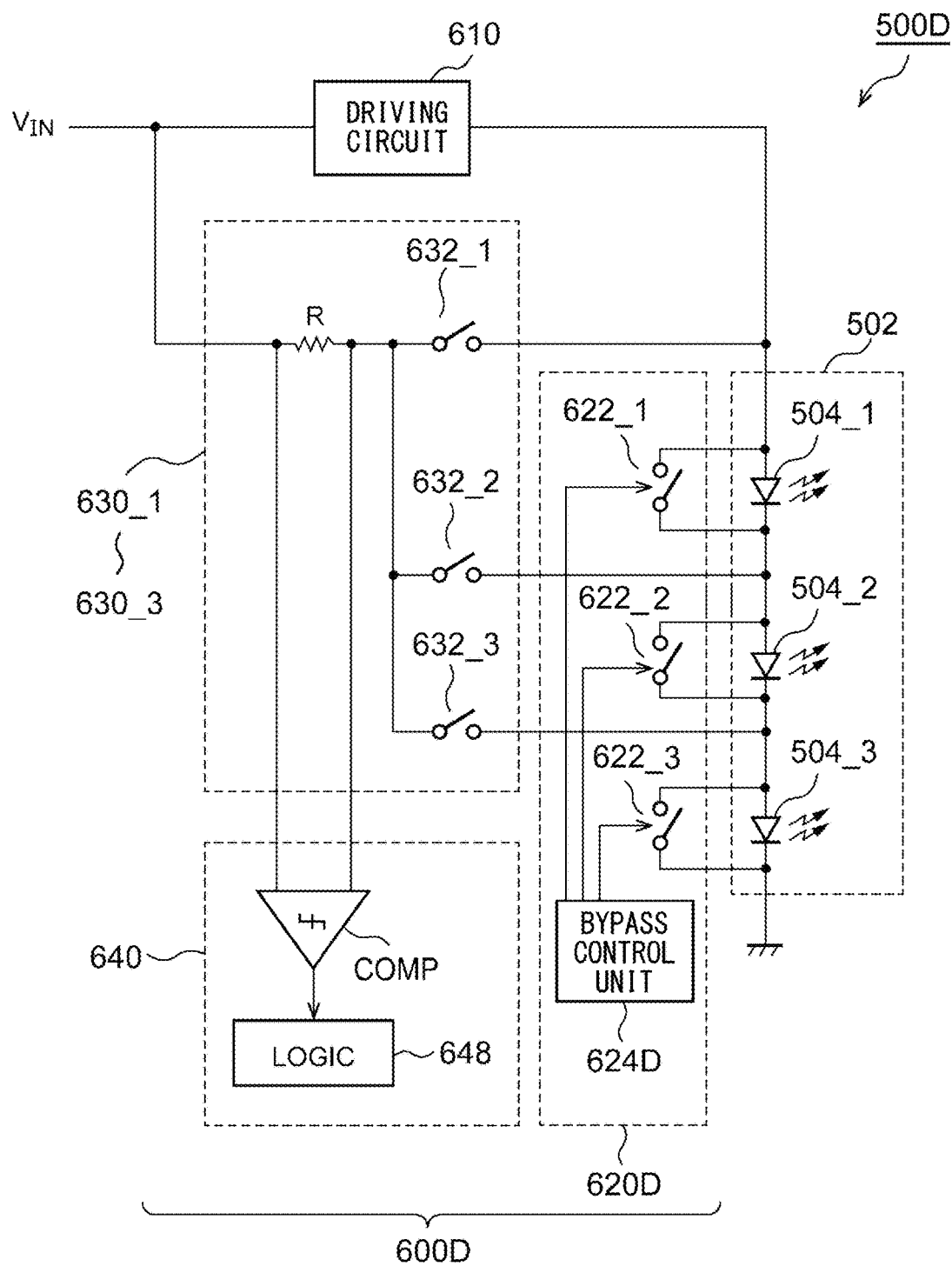
FIG. 12 is a block diagram showing an automotive lamp including a lighting circuit according to a fourth example.

FIG. 12 is a block diagram showing an automotive lamp 500D including a lighting circuit 600D according to a fourth example. Multiple auxiliary power supply circuits 630_1 through 630_3 are monolithically configured together with a shared current-limiting resistor R11. When an i-th switch 632_i is turned on, the i-th auxiliary power supply circuit 630_i is turned on. A judgment unit 640D includes a single comparison unit COMP1. When the i-th switch 632_i is turned on, the output of the comparison unit COMP' indicates the judgment result with respect to the i-th light-emitting element 504. With the fourth example, the circuit area can be reduced.

Figure 13A:
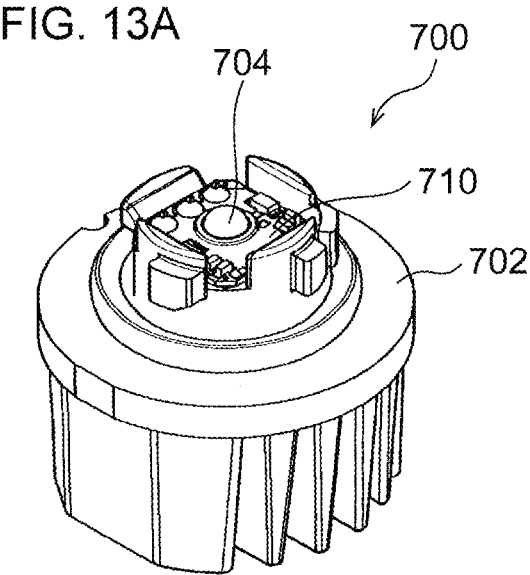
FIGS. 13A through 13D each show an LED socket which is an example of an automotive lamp.
Figure 13B:
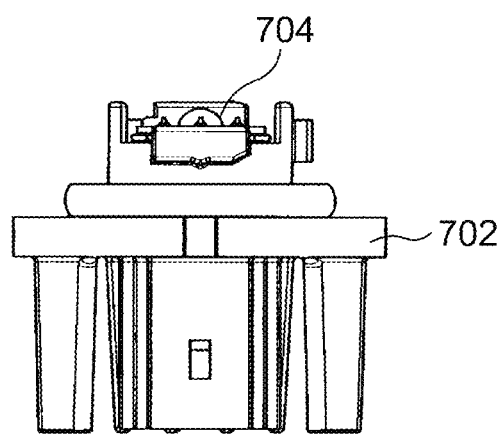
Figure 13C:
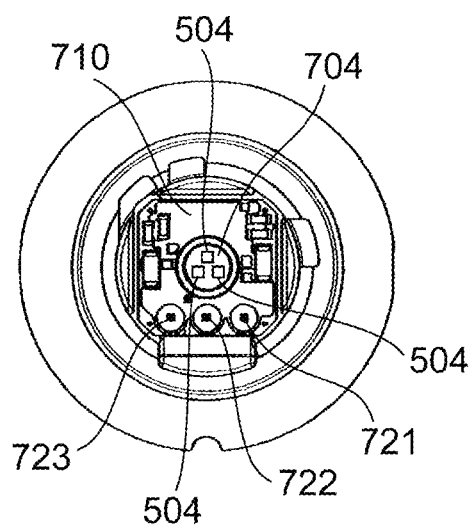
Figure 13D:
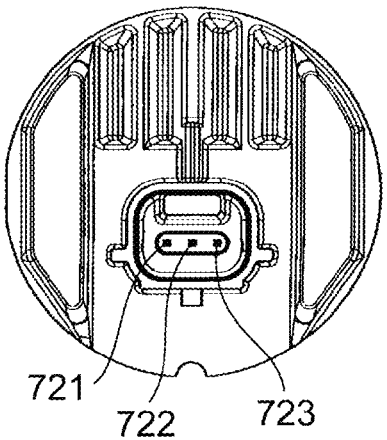

Next, description will be made regarding the usage of the automotive lamp 500. FIGS. 13A through 13D are diagrams each showing an LED socket which is an example of the automotive lamp 500. FIG. 13A is a perspective diagram showing an external view of an LED socket 700. FIG. 13B shows a front view of the LED socket 700. FIG. 13C is a plan view of the LED socket 700. FIG. 13D shows a bottom view of the LED socket 700.

A housing 702 has a structure that allows it to be detachably mounted on an unshown lamp body. Multiple light-emitting elements 504 are mounted in the central portion of the housing 702, which are covered by a transparent cover 704. Components of the lighting circuit 600 are mounted on a substrate 710. The multiple light-emitting elements 504 are each configured as a red LED chip, which are employed as a stop lamp.

In a case of providing an LED socket configured as both a stop lamp and a tail lamp, light-emitting elements used for the tail lamp are mounted such that they are adjacent to the multiple light-emitting elements 504. Furthermore, a lighting circuit for the tail lamp is mounted on the substrate 710.

Three pins 721, 722, and 723 are provided on the bottom side of the housing 702 such that they are exposed. The input voltage $V_{IN}$ is supplied to the pin 721 via a switch. The ground voltage is supplied to the pin 722. The pin 723 receives the supply of an input voltage which is set to the high level when the tail lamp is to be turned on. The pins 721 through 723 are arranged such that they pass through the internal space of the housing 702, and such that one end of each of the pins 721 through 723 is coupled to a wiring pattern of the substrate 710.

Description has been made above regarding an embodiment of the present disclosure with reference to the embodiment. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present disclosure. Description will be made below regarding such modifications.

Modification 1

Description has been made in the embodiments regarding an arrangement in which the auxiliary power supply circuit 630 is configured as the current-limiting resistor R11. However, the present disclosure is not restricted to such an arrangement. Also, the auxiliary power supply circuit 630 may be configured as a appropriately biased transistor.

Modification 2

In the example shown in FIG. 5, the current-limiting resistor R11 included in the auxiliary power supply circuit 630 may be designed to have a sufficiently high resistance value, and the switch 632 may be omitted. In a case in which the impedance of the current-limiting resistor R11 is sufficiently higher than the impedance of the driving circuit 610, even in a case in which the switch 632 is omitted, the effect of the current-limiting resistor R11 is negligible in the normal voltage state in which the bypass circuit 620 is disabled and all the light-emitting elements 504_1 through 504_3 are driven by the driving circuit 610.

Modification 3

In the example shown in FIG. 6, in a case in which a voltage drop across the current-limiting resistor R11 is sufficiently large when the element 505 to be bypassed is operating normally, the amplifier 642 can be omitted. Also, instead of the voltage comparator 644, a bipolar transistor or a MOS transistor may be employed as a voltage comparison unit.

Modification 4

Description has been made with reference to FIGS. 5 and 6 regarding the examples in which the occurrence of an open-circuit fault in the element 505 to be bypassed is detected based on a voltage drop across the current-limiting resistor R11. However, the present disclosure is not restricted to such an arrangement. For example, the judgment unit 640 may detect the occurrence of an open-circuit fault based on the voltage at a connection node that couples the auxiliary power supply circuit 630 and the element 505 to be bypassed, i.e., the voltage across both ends of the element 505 to be bypassed. When an open-circuit fault has occurred in the element 505 to be bypassed, the voltage at a connection node that couples the auxiliary power supply circuit 630 and the element 505 to be bypassed is substantially the same as the input voltage $V_{IN}$. When the element 505 to be bypassed is operating normally, the voltage at the connection node becomes equal to the forward voltage Vf of the element 505 to be bypassed. Accordingly, the occurrence of an open-circuit fault in the element 505 to be bypassed can be detected by comparing the voltage at the connection node with a threshold value determined to be higher than the forward voltage Vf.

Modification 5

In a case in which the time required for the open-circuit fault judgment for the element 505 to be bypassed is sufficiently short (e.g., several ms to several dozen ms) that the light emission cannot be perceived by the user even if the element 505 to be bypassed emits light, the auxiliary current $I_{AUX}$ may be designed to be on the same order as the target value $I_{REF}$ of the driving current $I_{LED}$.

In this case, such an arrangement may specify a minimum voltage state in which the input voltage $V_{IN}$ is lower than that in the low-voltage state. In the minimum voltage state, the driving circuit 610 may be suspended. Instead, the element 505 to be bypassed may be turned on by means of the auxiliary power supply circuit 630. With this, the three light-emitting elements 504_1 through 504_3 can be turned on in the normal voltage state. Furthermore, the two light-emitting elements 504_1 through 504_2 can be turned on in the low-voltage state. Moreover, the single light-emitting element 504_3 can be turned on in the minimum voltage state. In this case, the auxiliary current $I_{AUX}$ may be designed to be on the same order as the target value $I_{REF}$ of the driving current $I_{LED}$.

Modification 6

Description has been made regarding an arrangement in which the auxiliary power supply circuit 630 is coupled to the input line. However, the present disclosure is not restricted to such an arrangement. The auxiliary power supply circuit 630 may be coupled to a different line at which a voltage that is higher than the forward voltage Vf of the element 505 to be bypassed occurs.

Modification 7

Description has been made in the embodiments regarding an arrangement in which a resistor is employed as the current-limiting element. However, the present disclosure is not restricted to such an arrangement. Also, a transistor may be employed as the current-limiting element.

Modification 8

Description has been made above with reference to the flowchart shown in FIG. 8 regarding an arrangement in which the judgment target is sequentially switched in order from the element to be bypassed arranged on the lowest-voltage side toward the element to be bypassed arranged on the highest-voltage side. However, the present disclosure is not restricted to such an arrangement. Also, the target to be tested may be switched in order from the element to be bypassed arranged on the highest-voltage side toward the element to be bypassed arranged on the lowest-voltage side. In this case, the i-th element 504_i to be bypassed is employed as the judgment target while incrementing the variable i from 1 up to m. In this stage, the bypass switches 622_(i+1), 622_(i+2), ..., 622_(i+m), which are positioned on a voltage side that is lower than that of the i-th element 504_i to be bypassed, are set to the on state. When judgment has been made that the element 504_i to be bypassed, which is the judgment target, is operating normally, the flow proceeds to the judgment for the next element to be bypassed.

Description has been made regarding an arrangement in which the automotive lamp 500 is configured as a stop lamp or a tail lamp. However, the present disclosure is not restricted to such an arrangement. Also, the automotive lamp 500 may be configured as a headlamp.

While the preferred embodiments of the present disclosure have been described using specific terms, such description is for illustrative purposes only, and it is to be understood that changes and variations may be made without departing from the spirit or scope of the appended claims.

What is claimed is:

1. A lighting circuit for a semiconductor light source comprising a plurality of light-emitting elements coupled in series, the lighting circuit comprising:
   a driving circuit structured to receive an input voltage, and to supply a driving current to the semiconductor light source via a driving path;
   a bypass circuit coupled across a light-emitting element configured to be bypassed which is a part of the plurality of light-emitting elements, and structured to be set to an enabled state when the input voltage is in a low-voltage state so as to bypass the driving current;
   an auxiliary power supply circuit structured to supply electric power to the light-emitting element configured to be bypassed via an auxiliary path that is separate from the driving path; and
   a judgment unit structured to judge whether or not an open-circuit fault has occurred in the light-emitting element configured to be bypassed based on an electrical state of the auxiliary power supply circuit in a state where the bypass circuit is set to a disabled state and the driving current is zero.

2. The lighting circuit according to claim 1, wherein, when judgment has been made that the light-emitting element configured to be bypassed is operating normally, the bypass circuit is structured to allow the bypass circuit to be set to the enabled state.

3. The lighting circuit according to claim 1, wherein the judgment unit makes the judgment at a timing that is at least one from among (i) a timing before the electrical state becomes the low-voltage state in a period in which lighting is executed, and (ii) at a timing when the electrical state is the low-voltage state when lighting is started.

4. The lighting circuit according to claim 1, wherein the auxiliary power supply circuit comprises a current-limiting element provided between the light-emitting element configured to be bypassed and an input line via which the input voltage is applied.

5. The lighting circuit according to claim 4, wherein the auxiliary power supply circuit further comprises a switch between the light-emitting element configured to be bypassed and an input line via which the input voltage is applied, such that it is coupled in series with the current-limiting element.

6. The lighting circuit according to claim 4, wherein, when a voltage drop across the current-limiting element is lower than a predetermined threshold, the judgment unit judges that the open-circuit fault has occurred.

7. The lighting circuit according to claim 1, wherein, in a further low-voltage state, the lighting circuit is structured to suspend the driving circuit, and to be capable of turning on only the light-emitting element configured to be bypassed by means of the auxiliary power supply circuit.

8. The lighting circuit according to claim 1, wherein a plurality of light-emitting elements configured to be bypassed are provided,
wherein the bypass circuit comprises a plurality of bypass switches that correspond to the plurality of light-emitting elements configured to be bypassed,
and wherein the lighting circuit comprises a plurality of auxiliary power supply circuits that correspond to the plurality of light-emitting elements configured to be bypassed.

9. The lighting circuit according to claim 8, wherein, after all the bypass switches are set to an off state, the judgment unit sequentially switches a judgment target in order from the light-emitting element configured to be bypassed arranged on the lowest-voltage side toward the light-emitting element configured to be bypassed arranged on the highest-voltage side,
and wherein, when judgment has been made that the light-emitting element configured to be bypassed thus selected as the judgment target is operating normally, the corresponding bypass switch is set to the on state, and the judgment target is switched to the next light-emitting element configured to be bypassed.

10. The lighting circuit according to claim 8, wherein the judgment unit sequentially switches a judgment target in order from the light-emitting element configured to be bypassed arranged on the highest-voltage side toward the light-emitting element configured to be bypassed arranged on the lowest-voltage side,
wherein, when a given light-emitting element configured to be bypassed is selected as the judgment target, the bypass switches arranged on a voltage side that is lower than that of the light-emitting element configured to be bypassed thus selected as the judgment target are set to the on state,
and wherein, when judgment is made that the light-emitting element configured to be bypassed thus selected as the judgment target is operating normally, the judgement target is switched to the next light-emitting element configured to be bypassed.

11. The lighting circuit according to claim 8, wherein the plurality of auxiliary power supply circuits each comprise a current-liming resistor,
wherein the judgment unit comprises:
a plurality of comparison units arranged such that they correspond to the plurality of auxiliary power supply circuits, and each structured to compare a voltage drop across the corresponding current-limiting resistor with a predetermined threshold value; and
a logic circuit structured to process outputs of the plurality of comparison units.

12. The lighting circuit according to claim 11, wherein the logic circuit comprises:
a plurality of flip-flops; and
a plurality of logic gates,
wherein each logic gate performs a logical operation on an output of the flip-flop arranged as a previous stage and an output of the corresponding comparison unit,
and wherein each flip-flop receives an output of the corresponding logic gate via an input terminal thereof.

13. The lighting circuit according to claim 12, wherein, in a judgment operation of the judgment unit, each bypass switch is on/off controlled according to an output of the corresponding flip-flop.

14. An automotive lamp comprising:
a semiconductor light source comprising a plurality of light-emitting elements; and
the lighting-circuit according to claim 1, structured to drive the semiconductor light source.

15. The automotive lamp according to claim 14, configured as an LED socket.

16. A lighting circuit for a semiconductor light source comprising a plurality of light-emitting elements coupled in series, the lighting circuit comprising:
a driving circuit structured to receive an input voltage, and to supply a driving current to the semiconductor light source via a driving path;
a bypass circuit coupled across a part of the plurality of light-emitting elements, and structured to be set to an enabled state when the input voltage is in a low-voltage state so as to bypass the driving current;
a current-limiting element arranged in parallel with the driving circuit, and a combination of the current-limiting element and the driving circuit is in series with the part of the plurality of the light-emitting elements, the current-limiting element being on an auxiliary path that is separate from the driving path; and
a judgment unit structured to set the bypass circuit to a disabled state, and to judge whether or not an open-circuit fault has occurred in the part of the plurality of light-emitting elements based on a voltage drop across the current-limiting element in the disabled state of the bypass circuit and in a state where the driving current is zero.

* * * * *